United States Patent
Lin et al.

(10) Patent No.: US 6,751,668 B1
(45) Date of Patent: Jun. 15, 2004

(54) DENIAL-OF-SERVICE ATTACK BLOCKING WITH SELECTIVE PASSING AND FLEXIBLE MONITORING

(75) Inventors: YeeJang James Lin, San Jose, CA (US); Chung-Wen Soung, Los Gatos, CA (US)

(73) Assignee: Watchguard Technologies, Inc., Seattle, WA (US)

( * ) Notice: Subject to any disclaimer, the term of this patent is extended or adjusted under 35 U.S.C. 154(b) by 0 days.

(21) Appl. No.: 09/525,097

(22) Filed: Mar. 14, 2000

(51) Int. Cl.⁷ .............................................. G06F 15/16
(52) U.S. Cl. ..................... 709/227; 709/225; 709/226; 709/229; 709/235
(58) Field of Search ................................ 709/228, 227, 709/225, 219, 229, 223, 224; 714/4, 25

(56) References Cited

U.S. PATENT DOCUMENTS

| | | | |
|---|---|---|---|
| 5,371,852 A | | 12/1994 | Attanasio et al. |
| 5,473,599 A | | 12/1995 | Li et al. |
| 5,642,515 A | * | 6/1997 | Jones et al. ................. 710/220 |
| 5,892,917 A | * | 4/1999 | Myerson ..................... 709/224 |
| 6,078,943 A | * | 6/2000 | Yu .............................. 709/105 |
| 6,098,122 A | * | 8/2000 | Emmes et al. ................ 710/29 |
| 6,341,304 B1 | * | 1/2002 | Engbersen et al. ......... 709/203 |
| 6,425,057 B1 | * | 7/2002 | Cherkasova et al. ........ 711/134 |
| 6,430,619 B1 | * | 8/2002 | Sitaraman et al. .......... 709/225 |
| 6,526,448 B1 | * | 2/2003 | Blewett ....................... 709/224 |
| 6,529,955 B1 | * | 3/2003 | Sitaraman et al. .......... 709/225 |
| 6,662,230 B1 | * | 12/2003 | Eichstaedt et al. .......... 709/229 |

OTHER PUBLICATIONS

Cherkasova, Ludmila and Phaal Peter. "Session Based Admission Control: a Mechanism for Improving Performance of Commercial Web Sites." 1999. IEEE. Seventh International Workshop on Quality of Service. pp. 226–235.*

U.S. patent application Ser. No. 09/465,123, Lin, filed Dec. 16, 1999.

Abadi, M., et al, "Secure Web Tunneling," http://pa-.bell–labs.com/~abadi/Papers/tunnel/206.html, pp. 1–13 (Dec. 16, 2000).

"Intel ISP Program Case Studies: UUNET Canada Leads the Industry in Move to Virtual Private Networks," http://www.intel.com/isp/casestudies/uunet.htm, pp. 1–4 (2000).

"Tunnel Switching: 3Com Technology Boosts VPN Security and Flexibility," http://www.3com.com/technology/tech_net/white_papers/503049.html, pp. 10 (1999).

"Virtual Multi–megabit Access Path: Affordable and Available Internet and IP Access at Speeds Greater than T1," http://www.tiaranetworks.com/vmapwp.html, pp. 1–9 (1999).

"Web Workshop—Virtual Private Networking: An Overview," http://msdn.Microsoft.com/workshop/server/feature/vpnovw.asp, pp. 1–16 (May 29, 1998).

Ferguson, Paul and D. Senie, "Network Ingress Filtering: Defeating Denial of Service Attacks Which Employ IP Source Address Spoofing," http://andrew2.Andrew.cmu.edu/rfc/rfc2267.html, pp. 1–16 (Jan. 1998).

"The NetBoost Policy Engine: Comprehensive Platform Enables Today's Leading Policy Enforcement Applications to Operate at Full Wire Speed," NetBoost Corporation, pp. 1–9 (1998).

(List continued on next page.)

*Primary Examiner*—Saleh Najjar
(74) *Attorney, Agent, or Firm*—Arnall Golden Gregory LLP

(57) ABSTRACT

A method and apparatus for responding to denial of service attacks. Rather than a firewall or other device either denying all new session requests or denying no new session requests (and, albeit, dropping then-pending session requests), new session requests are selectively passed to the device.

11 Claims, 4 Drawing Sheets

OTHER PUBLICATIONS

"The NetBoost Policy Appliance: Device Enables Concurrent Operation of Multiple Policy Enforcement Applications to Operate at Full Wire Speed," NetBoost Corporation (1998).

"NetBoost PE—1000: Network Application Engine," NetBoost Corporation (1998).

NetBoost SKD: Software Development Kit, Net Boost Corporation (1998)..

"A New Breed: The Net Boost Platform for Policy Enforcement Applications," NetBoost Corporation, pp. 1–11 (1998).

Russell, Paul, "Keeping the TCP/IP Stream Flowing," Linux Magazine, http://www.linux-mag.com/1999-08/bestdefemse02.html, pp. 1–8 (Aug. 1999).

* cited by examiner

The shaded area is where the selective passing starts taking place.

DENIAL-OF-SERVICE ATTACK BLOCKING WITH SELECTIVE PASSING AND FLEXIBLE MONITORING

TECHNICAL FIELD

The present invention relates to denial of service attacks and, in particular, to a method of handling denial of service attacks without entirely blocking all new session connection requests.

BACKGROUND

Denial-of-Service (DoS) are well-known. In a typical DoS attack, the attacker employs Internet Protocol (IP) source address spoofing to directly or indirectly launch an immense volume of bogus traffic to a target system. For example, the attacker may use randomly changing or phony source addresses to flood bogus sessions with TCP SYN, UDP or ICMP packets to a specific target. This bogus traffic may be initiated from a single host, from a group of hosts in a specific network, or from any number of hosts on the Internet. The overwhelming number of bogus session requests potentially bogs down the resources of the target system and thus lead to DoS.

In response to a DoS attack, a typical firewall starts dropping all new session requests as soon as the rate of the incoming session requests exceeds a predetermined threshold. Until the blocking time for new session requests is expired, or the rate of new session requests falls off, the firewall denies any new session request. This mechanism is, in general, of use to protect the systems under attack. However, because all session requests are denied service, even legitimate requests are denied service.

Another approach that has been used to fight DoS attacks is known as Random Early Drop (RED). To implement RED, as a new session request is received, an unanswered session request is dropped. This approach is described, for example, in Linux Magazine, August 1999 (see http://www.linux-mag.com/1999-08/bestdefense_02.html). Thus, using RED, at least some legitimate session requests theoretically get through to the target system. However, there is high overhead involved with receiving the onslaught of bogus session requests and dealing with each received session request (by dropping a pending session request in response to it).

SUMMARY

The present invention is a method and apparatus for responding to denial of service attacks. Rather than a firewall or other device either denying all new session requests or denying no new session requests (and, albeit, dropping then-pending session requests), new session requests are selectively passed to the device.

DETAILED DESCRIPTION

Figure 1:
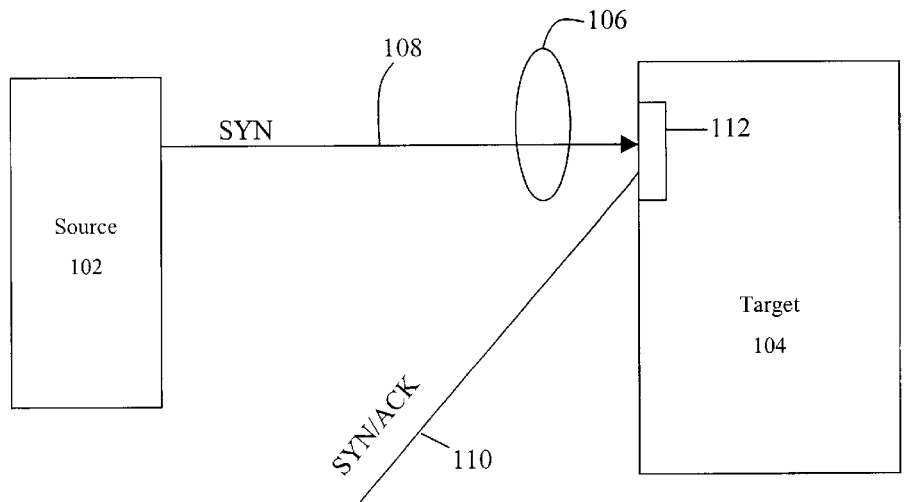
FIG. 1 illustrates an overall system in which the effect of Denial of Service attacks is lessened.

FIG. 1 illustrates an aspect of the invention in a broad form. Referring to FIG. 1, a source 102 initiates a session establishment request (e.g., a TCP SYN packet; a new UDP or ICMP packet) to a target 104. A connection is attempted to be established at a port 112 of the target 104. The arrow 110 represents a SYN/ACK acknowledgement by the target 104.

A filter 106 operates to selectively block session establishment packets 108 from being provided to the target 104. In particular, an abnormally high number of session establishment attempts is usually an indication that a denial of service (DoS) attack is occurring. The filter 106 records the total number of existing sessions and measures the rate of session requests of each stream. A "stream" is a data traffic flow between a particular source and a specific target. A source could be a single host, a group of hosts in a network or domain, or any number of hosts in the entire Internet. By the same token, a target could involve one or more hosts and servers in an internal network. However, the most likely scenario of a DoS attack occurs from an arbitrary host in the Internet to a specific site in an internal network. This specific site is usually represented by a single domain name or a virtual IP (VIP) address.

Figure 2:
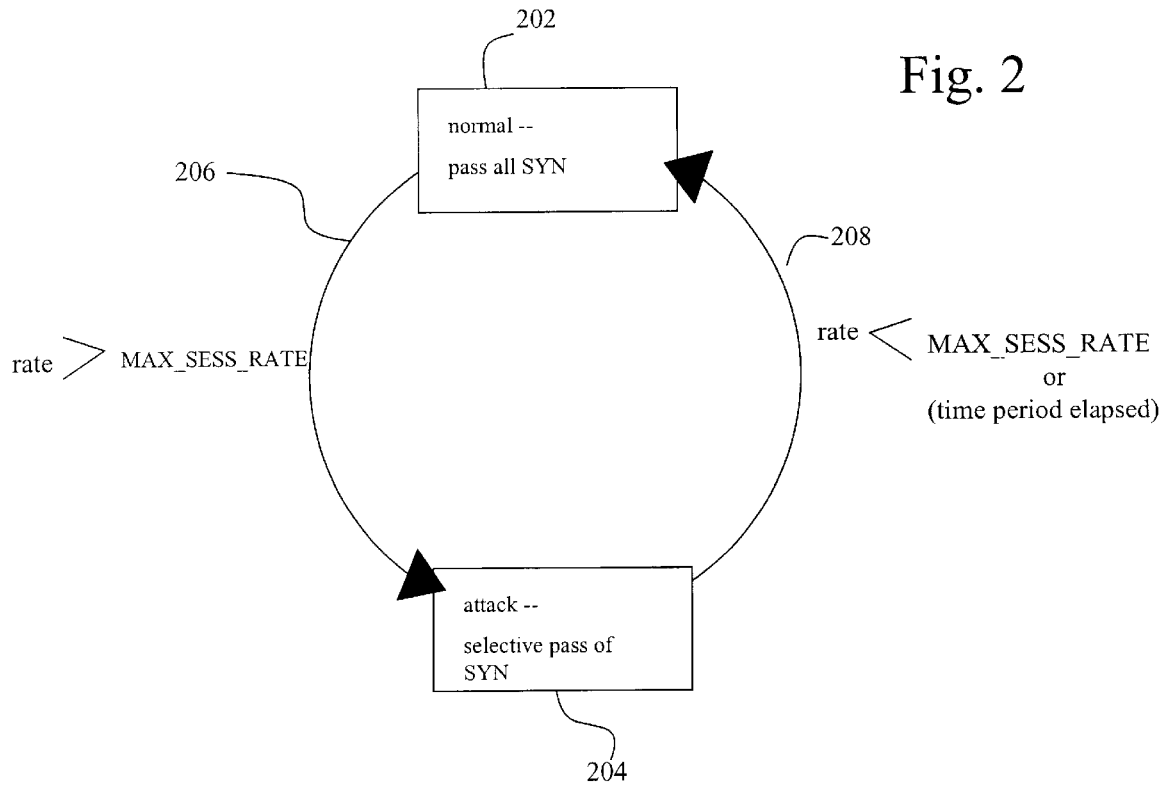
FIG. 2 illustrates a state machine according to which the filter of the FIG. 1 system operates.

In accordance with an aspect of the invention, the filter 106 employs a "rate limiting" mechanism to limit the rate of session establishment packet submission. For example, the filter may limit the rate to a particular number of session establishment requests per second. FIG. 2 illustrates a state machine that may be employed for the rate limiting. In a normal state 202, the filter allows all session establishment packets to be submitted to the target 104. If the rate of receipt of session establishment packets becomes greater than a configurable parameter MAX_SESS_RATE 206, then the state machine moves to an attack state 204 until the rate of receipt becomes less than MAX_SESS_RATE 208, at which time the state machine moves back to the normal state 202. Alternately, the condition 208 for returning to the normal state may be that a "time slot" has elapsed. In any event, once the condition 208 is met, the state machine moves back to the normal state 202.

Figure 3:
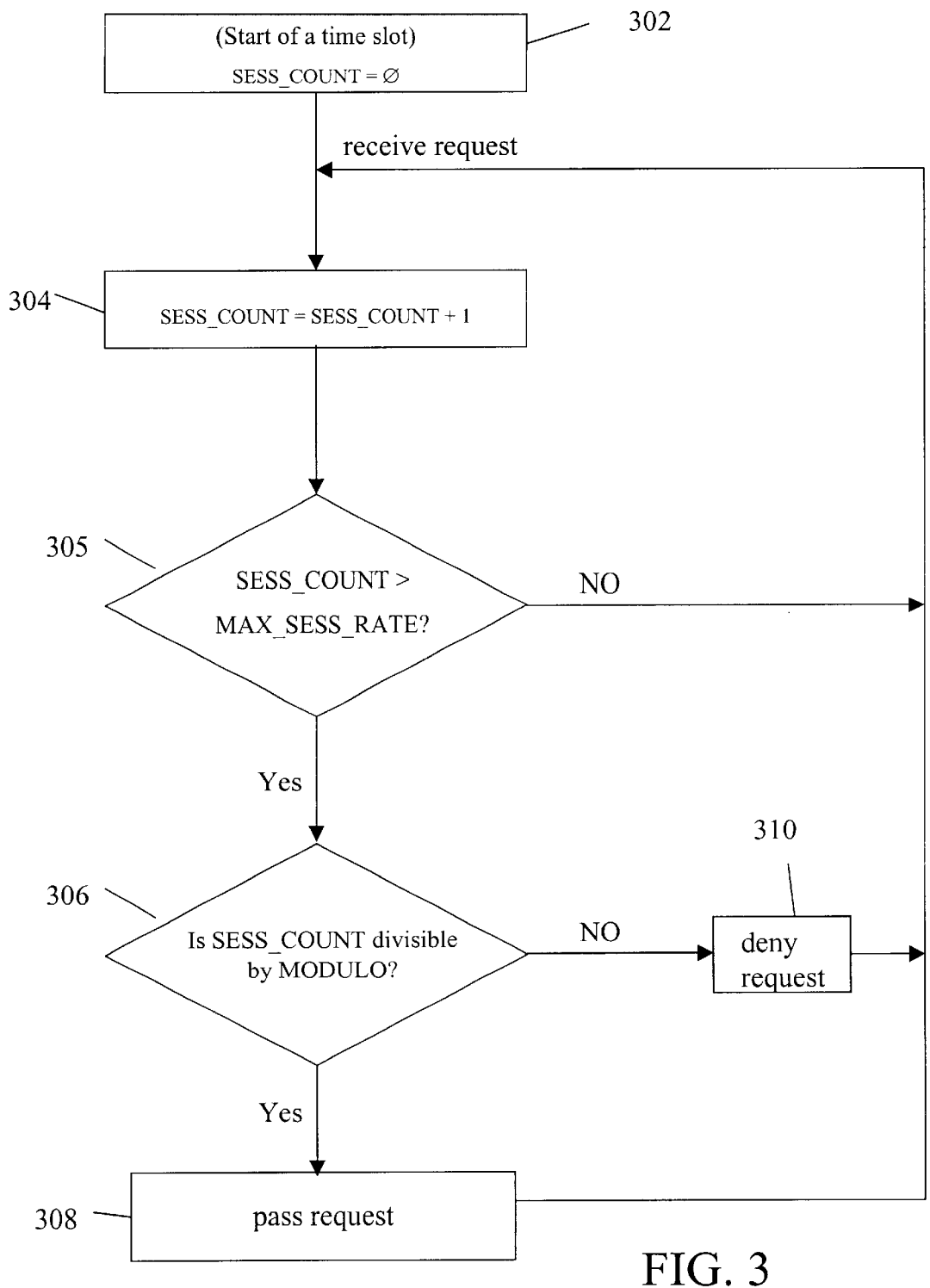
FIG. 3 is a flowchart illustrating how the filter operates in the "attack" state.

FIG. 3 illustrates one embodiment of the processing that occurs at the step 204. Initially, the count of session establishment packets received by the filter 106 is set to zero. This occurs at step 302, where the variable SESS_COUNT is set to zero. At step 304, after a session establishment packet has been received at the filter 106, the SESS_COUNT variable is incremented by one. At step 305, it is determined whether the SESS_COUNT exceeds the pre-configured threshold MAX_SESS_RATE or not. If not, the session request is passed to the target 104. If yes, further checking is conducted at step 306. At step 306, it is decided if the SESS_COUNT is divisible by a parameter MODULO. If so, the session establishment request is passed to the target 104. Otherwise, the session establishment request is denied (i.e., ignored) and processing by the filter is suspended until the next session establishment request is received. It can be seen that the parameter MODULO is related to the desired rate by 1/MODULO. For example, if it is-desired that ¼ of the session establishment requests be passed to the target 104, then MODULO is set to 4.

By selectively passing some of the session establishment requests, the filter 106 allows at least some legitimate session requests to get through to the target 104 (unlike the prior art "total blocking" method). In addition, because the number of requests to the target 104 is limited, the target 104 is freed of much overhead as compared to the random early drop method (RED) discussed in the Background.

Figure 4:
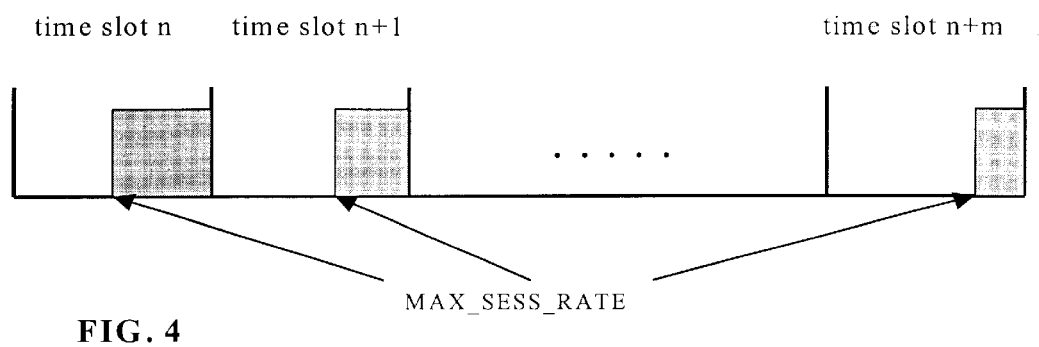
FIG. 4 illustrates a timeline for a selective passing process.
Figure 5:
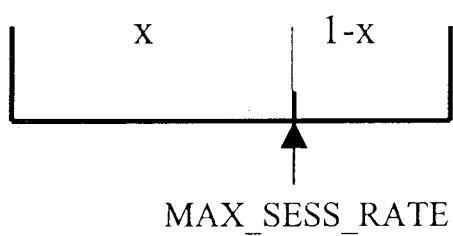
FIG. 5 illustrates a time slot for a maximum session rate.

With selective passing as discussed above with reference to FIG. 3, the probability that a legitimate session establishment request may be successful is calculated as now described with reference to FIGS. 4 and 5. FIG. 4 illustrates a timeline, and each shaded area is where the "selective passing" phase takes place. For example, each shaded area may include the processing of step 204 (FIG. 2). FIG. 5 illustrates a time slot, in which x represents the percentage of the amount of this particular time slot is being used before the MAX_SESS_RATE is reached, and (1–x) is the percentage used after the MAX_SESS_RATE is reached.

Assuming that the legitimate session initiator will retry r times, and that the MODULO parameter is defined as m. Then the probability for each session request to pass through successfully can be calculated as follows:

$$P_{pass} = x + \left(\frac{1-x}{m}\right)$$
$$= \frac{mx + 1 - x}{m}$$
$$= \frac{m - m + mx + 1 - x}{m}$$
$$= \frac{m - (m-1) + x(m-1)}{m}$$
$$= \frac{m - (m-1)(1-x)}{m}$$
$$= 1 - \left(\frac{m-1}{m}\right)(1-x)$$

So, the probability for a session request that will be unsuccessful to get to the desired server with this particular time slot is:

$$P_{drop} = \left(\frac{m-1}{m}\right)(1-x)$$

If the session initiator is to retry r times, the overall $$P_{drop} \text{ is } \left(\left(\frac{m-1}{m}\right)(1-x)\right)^r,$$

and it can be seen that $$m \uparrow \Rightarrow P_{drop} \uparrow \Rightarrow P_{pass} \downarrow$$
$$x \uparrow \Rightarrow P_{drop} \downarrow \Rightarrow P_{pass} \uparrow$$
$$r \uparrow \Rightarrow P_{drop} \downarrow \Rightarrow P_{pass} \uparrow$$

The above discussion is illustrated by some examples. In one example, it is assumed that x is 0.5, the retry count r is 3, and the MODULO m is 8, then the probability for this session request to pass through is $$100\% * \left[1 - \left(\left(\frac{8-1}{8}\right)(1-0.5)\right)^3\right] \approx 91.63\%$$

In another example, x is also 0.5, but the retry count r is 5, and the MODULO m is 4. The probability for this session request to pass through is $$100\% * \left[1 - \left(\left(\frac{4-1}{4}\right)(1-0.5)\right)^5\right] \approx 99.26\%$$

It can be seen, then, with selective passing, the probability of success for a legitimate session request to pass through during a DoS attack is surprising high. Typically a legitimate session initiator will retry the session establishment several times if packet is discarded or lost while bogus session requests from attackers are not doing so. With this differentiation between a legitimate session and a bogus session, the above probability model is very effective to screen out bogus sessions but allow legitimate sessions to pass through.

Furthermore, because the selective passing algorithm is applied only to new session requests, once a session is established the user data associated with that session passes through the filter 106 transparently. Thus, the performance impact is minimal.

The scope of the invention should be construed in view of the claims appended. hereto, and should not be literally tied to the described embodiment. For example, unless so limited by the claims, the filter 106 may be implemented in hardware, software or some combination of both.

What is claimed is:

1. A method of regulating session establishment requests, including bogus session establishment requests, to a server computer in a computer network, comprising the steps of:
   receiving a plurality of session establishment requests for the server computer;
   determining an incoming rate at which the plurality of session establishment requests are received;
   incrementing a session count for each session establishment request received;
   if the incoming rate is lower than a predefined threshold, processing all the plurality of session establishment requests received;
   if the incoming rate is higher than the predefined threshold and the session count is divisible by a redefined parameter, then processing the of session establishment request associated with the session count.

2. The method of claim 1, further comprising the step of setting a value for the predefined threshold.

3. The method of claim 1, further comprising the step of setting a value for the predefined parameter.

4. The method of claim 3, further comprising the step of, if the incoming rate is higher than the predefined threshold and the session count is not divisible by the predefined parameter, denying the session establishment request associated with the session count.

5. A method of regulating session establishment requests, including bogus session establishment requests, to a server computer in a computer network, comprising the steps of:
   receiving a plurality of session establishment requests for the server computer;
   determining an incoming rate at which the plurality of session establishment requests are received;
   if the incoming rate is lower than a predefined rate, processing all the plurality of session establishment requests received; and
   if the incoming rate is higher than the predefined rate, setting a time slot, and
      if the time slot has not expired, processing according to a predefined criterion a subset of the plurality of session establishment requests.

6. The method of claim 5, further comprising the step of setting a value for the predefined rate.

7. The method of claim 5 further comprising the step of adding an incoming session establishment request to a total number of existing sessions.

8. The method of claim 7, wherein the step of processing according to a predefined criterion further comprising the steps of:

setting a parameter;

if the total number of existing sessions is divisible by the parameter, processing the incoming session establishment request by the server; and if the total number of existing sessions is not divisible by the parameter, denying the incoming session establishment request.

9. The method of claim 5, further comprising the step of, if the time slot expires, processing all the plurality of session establishment requests received.

10. The method of claim 5, wherein the step of receiving a plurality of session establishment requests is at another computer on the computer network.

11. The method of claim 5, wherein the step of receiving a plurality of session establishment requests is at the server computer.

* * * * *